(12) United States Patent
Inoue et al.

(10) Patent No.: US 6,188,495 B1
(45) Date of Patent: Feb. 13, 2001

(54) OPTICAL TRANSMISSION-RECEPTION APPARATUS

(75) Inventors: Tatsuo Inoue; Yoichi Toriumi, both of Tokyo (JP)

(73) Assignee: Sony Corporation, Tokyo (JP)

( * ) Notice: Under 35 U.S.C. 154(b), the term of this patent shall be extended for 0 days.

(21) Appl. No.: 08/975,908

(22) Filed: Nov. 21, 1997

(30) Foreign Application Priority Data

Nov. 25, 1996 (JP) .................................................. 8-314009

(51) Int. Cl.[7] .................................................. H04B 10/00
(52) U.S. Cl. .................. 359/152; 359/153; 359/156; 359/122; 359/163
(58) Field of Search .................................. 359/152, 153, 359/163, 156, 122

(56) References Cited

U.S. PATENT DOCUMENTS

| | | | |
|---|---|---|---|
| 4,626,878 | * 12/1986 | Kuwano et al. | 357/19 |
| 5,127,075 | * 6/1992 | Althaus et al. | 385/94 |
| 5,283,680 | * 2/1994 | Okugawa et al. | 359/171 |
| 5,446,719 | * 8/1995 | Yoshida et al. | 369/116 |
| 5,479,540 | * 12/1995 | Boudrean et al. | 385/14 |
| 5,566,265 | * 10/1996 | Spaeth et al. | 385/93 |
| 5,844,682 | * 12/1998 | Kiyomoto et al. | 356/369 |
| 5,852,507 | * 12/1998 | Hall | 359/192 |

* cited by examiner

Primary Examiner—Leslie Pascal
Assistant Examiner—Hanh Phan
(74) Attorney, Agent, or Firm—Limbach & Limbach L.L.P.; Andrew V. Smith, Esq.

(57) ABSTRACT

A transmission optical signal emitted from a laser diode is introduced in an S-polarized state to a polarization-reflection film formed on an inclined surface of a prism. This transmission optical signal is in a light quantity that is reflected by the polarization-reflection film to enter an optical fiber. With this configuration, an optical transmission-reception apparatus for a single-core bi-directional optical communication circuit enables an enhancement of the efficiency of introduction of the transmission optical signal into the optical fiber constituting the optical communication circuit so that a sufficient performance and reliability of the optical communication circuit is realized without increasing the light quantity emitted from the laser diode which outputs the transmission optical signal.

15 Claims, 7 Drawing Sheets

OPTICAL TRANSMISSION-RECEPTION APPARATUS

BACKGROUND OF THE INVENTION

1. Field of the Invention

The present invention relates to a field of an optical transmission-reception apparatus used in a single-core bi-directional optical communication circuit using an optical fiber and more particularly, to an optical transmission-reception apparatus for use in an optical communication circuit using a plastic optical fiber in a domestic communication network.

2. Description of the Prior Art

There has been proposed an optical communication circuit connected to an optical transmission-reception apparatus. The optical transmission-reception apparatus constituting such an optical communication circuit is used for connection between various apparatuses such as a computer, a digital video apparatus, and an audio apparatus.

FIG. 1 shows a conventional optical transmission-reception apparatus including a socket 104 to be connected to a plug 103 holding a first plastic optical fiber 101 for transmission and a second plastic optical fiber 102 for reception. In this optical transmission-reception apparatus, the socket 104 has a built-in light-emitting element 105 for emitting a first optical signal 106 which has been modulated according to a signal to be transmitted and a built-in light-receiving element 108 for receiving a second optical signal 107 which has been modulated according to a transmitted signal. The light-emitting element 105 and the light-receiving element 108 are divided from each other by a shielding wall 109 to prevent leaking of the first optical signal 106 and the second optical signal 107 into the light-receiving element 108 and the light-emitting element 105, respectively.

In a state when the plug 103 is connected to the socket 104, the first optical signal 106 emitted from the light-emitting element 105 is introduced into an end face of the first plastic optical fiber 101. Moreover, in the state when the plug 103 is connected to the socket 104, the second optical signal 107 emitted from an end face of the plastic optical fiber 102 is received by the light-receiving element 108.

In an optical communication circuit constituted by using the aforementioned transmission-reception apparatus, two plastic optical fibers are used: one for transmission and the other for reception. Consequently, the plug and the socket have a considerable size, which is not preferable for an optical communication circuit to be used as a domestic communication network. That is, the optical communication circuit to be used as a domestic communication network should be simplified as a single-core bi-directional optical communication circuit.

In an optical transmission-reception apparatus constituting a single-core bi-directional optical communication circuit, it is necessary to coaxially overlap the first optical signal which is a transmission signal and the second optical signal which is a reception signal. As means for coaxially overlapping two beams having opposite advancing directions, there can be considered use of a so-called half mirror (semitransparent film). That is, one of the first and the second optical signals has an optical path passing through the half mirror and the other of the optical signals has an optical path reflected by the half mirror. Thus, the first optical signal and the second optical signal are coaxially overlapped.

However, in this half mirror, the total of the transmittance and the reflectance does not exceed 100% and each of the transmittance and the reflectance is equal to or less than 50%. That is, when overlapping the first optical signal and the second optical signal by using a half mirror, the optical signal passing through this half mirror and the optical signal reflected by this half mirror have a loss of about 50%, respectively.

If the first optical signal which is a transmission signal is decreased in light quantity and introduced into the plastic optical fiber, the transmission distance available is reduced and it is impossible to assure a sufficient performance and reliability of the optical communication circuit.

In order to compensate the loss of light quantity because of the half mirror, it can be considered to increase the light quantity emitted by the light-emitting element. However, in a laser diode used as the light-emitting element, the light quantity emitted has a trade-off relationship with the service life and reliability of the element. If the light quantity emitted is increased, then the service life of the element is reduced and its reliability is lowered.

SUMMARY OF THE INVENTION

It is therefore an object of the present invention to provide an optical transmission-reception apparatus constituting a single-core bi-directional optical communication circuit in which the efficiency of introduction of a transmission optical signal to an optical fiber is improved to enable to realize a sufficient performance and reliability of the optical communication circuit without increasing the light quantity emitted from a light-emitting element which outputs the transmission optical signal.

The optical transmission-reception apparatus according to the present invention includes: an optical transmission medium connection block to which an optical transmission medium is connected for transmitting to a second end face; a first optical signal inputted from a first end face; light-emitting means for emitting the first optical signal which is in a linearly polarized state; a beam splitting film is provided on an optical path starting at the light-emitting element and reaching the first end face of the optical transmission medium, so as to split a second optical signal emitted from the first end face of the optical transmission medium, from an optical path reaching the light-emitting element; and light-receiving means for receiving the second optical signal via the beam splitting film.

DETAILED DESCRIPTION OF THE PREFERRED EMBODIMENTS

Description will now be directed to an embodiment of the present invention with reference to the attached drawings.

Figure 1:
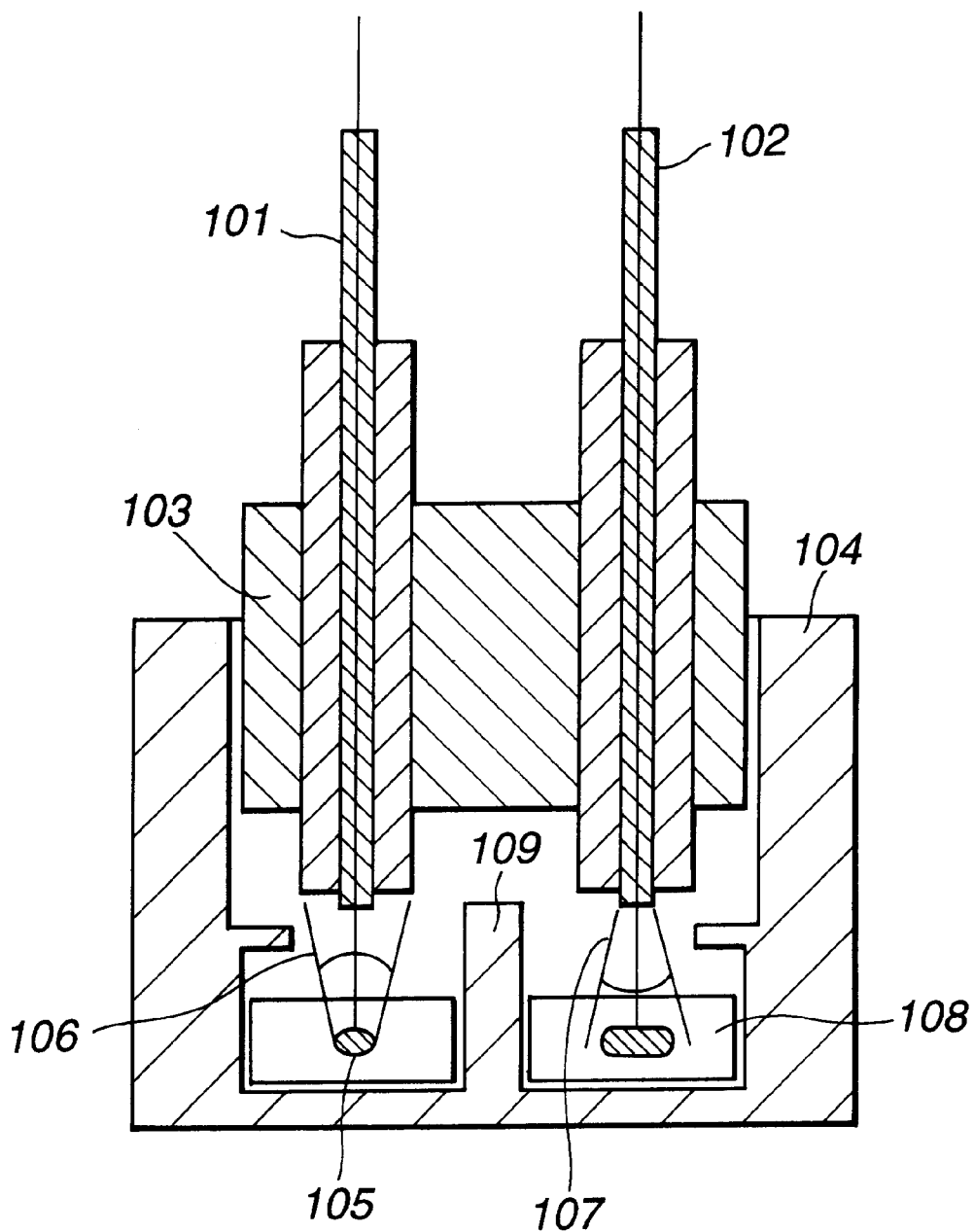
FIG. 1 is a longitudinal cross-sectional view shown in a configuration of a conventional optical transmission-reception apparatus.
Figure 2:
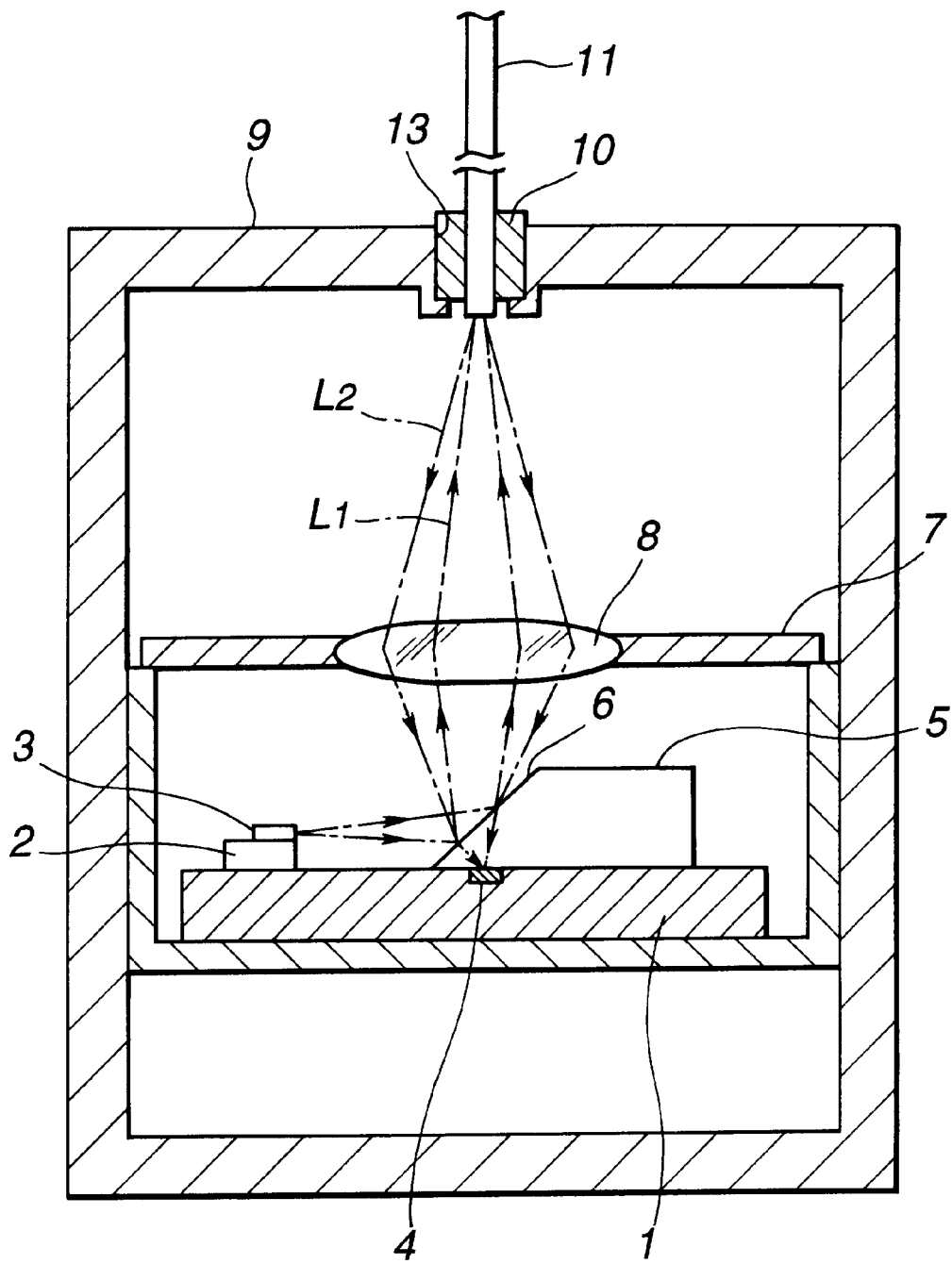
FIG. 2 is a longitudinal cross-sectional view showing a configuration of an optical transmission-reception apparatus according to the present invention.

As shown in FIG. 2, the optical transmission-reception apparatus according to the present invention is connected to an optical fiber 11 serving as a communication line in a single-core bi-directional optical communication circuit, so as to emit a first optical signal L1 to be transmitted, into the optical fiber 11, and to receive a second optical signal L2 fed through the optical fiber 11. This single-core bi-directional optical communication circuit is preferably used as a domestic communication network. The optical fiber 11 is a plastic optical fiber of a large diameter (about 1 mm of diameter, for example).

Figure 3:
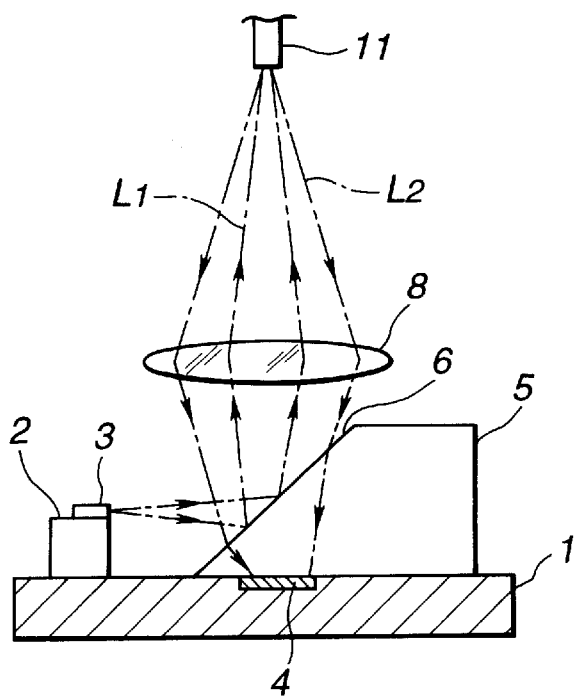
FIG. 3 is a side view showing a configuration of the essential portion of the optical transmission-reception apparatus.
Figure 4:
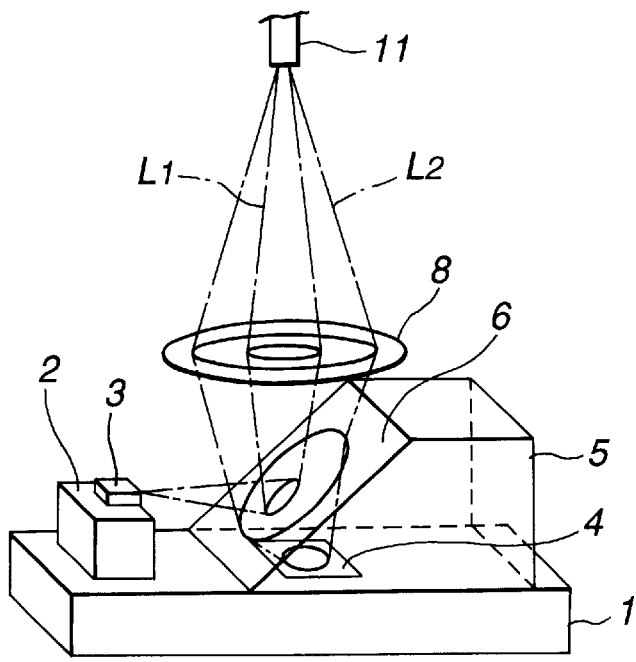
FIG. 4 is a perspective view showing the configuration of the essential portion of the optical transmission-reception apparatus.

As shown in FIG. 3, this optical transmission-reception apparatus includes a laser diode 3 serving as a light-emitting element for emitting the first optical signal L1 in a linearly polarized state and a photo diode 4 serving as a light-receiving element for receiving the second optical signal L2. As shown in FIG. 4, the laser diode 3 and the photo diode 4 are provided on a semiconductor substrate 1 made from a silicon semiconductor or a Ga—As semiconductor. That is, the photo diode 4 is formed on a surface of the semiconductor substrate 1. The laser diode 3 is arranged on a heat sink section 2 provided on the semiconductor substrate 1. The laser diode 3 emits a laser beam which is a diffused beam linearly polarized in a direction parallel to the upper surface of the semiconductor substrate 1.

The laser beam emitted from the laser diode 3 has been modulated according to a signal to be transmitted, i.e., into the first optical signal L1. This first optical signal L1 is introduced at an inclined plane of a prism 5 provided on the semiconductor substrate 1. This prism 5 has an inclined plane and is provided on the photo diode 4.

The inclined plane of the prism 5 makes an angle of 45 degrees with respect to the upper plane of the semiconductor substrate 1, so as to deflect by 90 degrees the first optical signal L1 emitted from the laser diode 3 so that the optical signal L1 advances as a beam in a vertical direction to the upper plane of the semiconductor substrate 1. The inclined plane of the prism 5 is covered with a beam splitting film 6.

Figure 6:
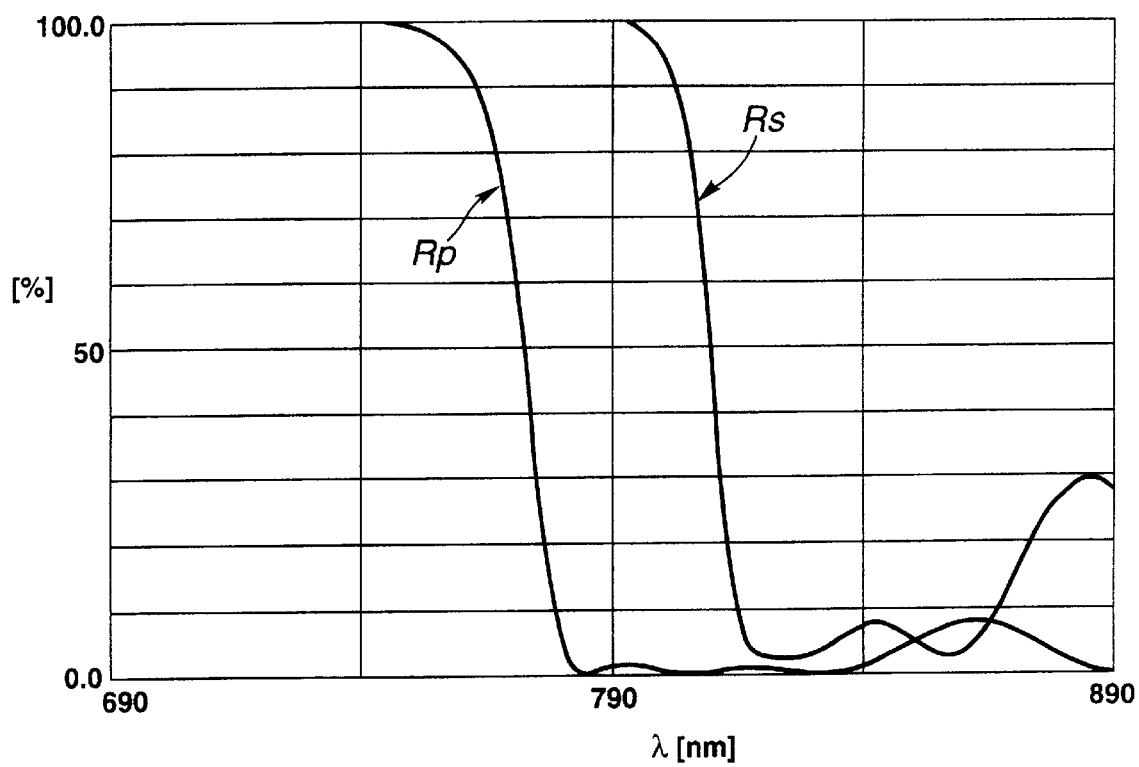
FIG. 6 is a graphic chart showing a reflection characteristic of a beam splitting film constituting the optical transmission-reception apparatus with respect to a linearly polarized beam.

The beam splitting film 6 is a so-called polarization-reflection film and as shown in FIG. 6, the reflectance and the transmittance have polarization dependency. That is, in the present design, for the center wavelength (for example, 790 nm), an S-polarized beam component has a reflectance Rs which is approximately 100%. On the other hand, also in the present design, for the center wavelength, a P-polarized beam component has a reflectance Rp which is approximately 0%.

The first optical signal L1 enters the beam splitting film 6 in the S-polarized state. The laser diode 3 is arranged on the semiconductor substrate 1 in such a manner that the first optical signal L1 is in the S-polarized state with respect to the beam splitting film 6. Consequently, a greater part of the first optical signal L1 emitted from the laser diode 3 is reflected by the beam splitting film 6 and deflected by 90 degrees. Thus, in this optical transmission-reception apparatus, a beam emitted from the laser diode 3 can be introduced as the first optical signal L1 into the optical fiber 11 with a significantly high efficiency.

The first optical signal L1 reflected by the beam splitting film 6, passing through a lens 8, reaches the end face of the optical fiber 11. This lens 8 focuses the first optical signal L1 to be introduced to the end face of the optical fiber 11. The lens 8 is engaged to be held in a through hole formed in the upper plane of a frame-shaped housing 7 containing the semiconductor substrate 1, so that the lens 8 is arranged at a position corresponding to the inclined plane of the prism 5.

Figure 5:
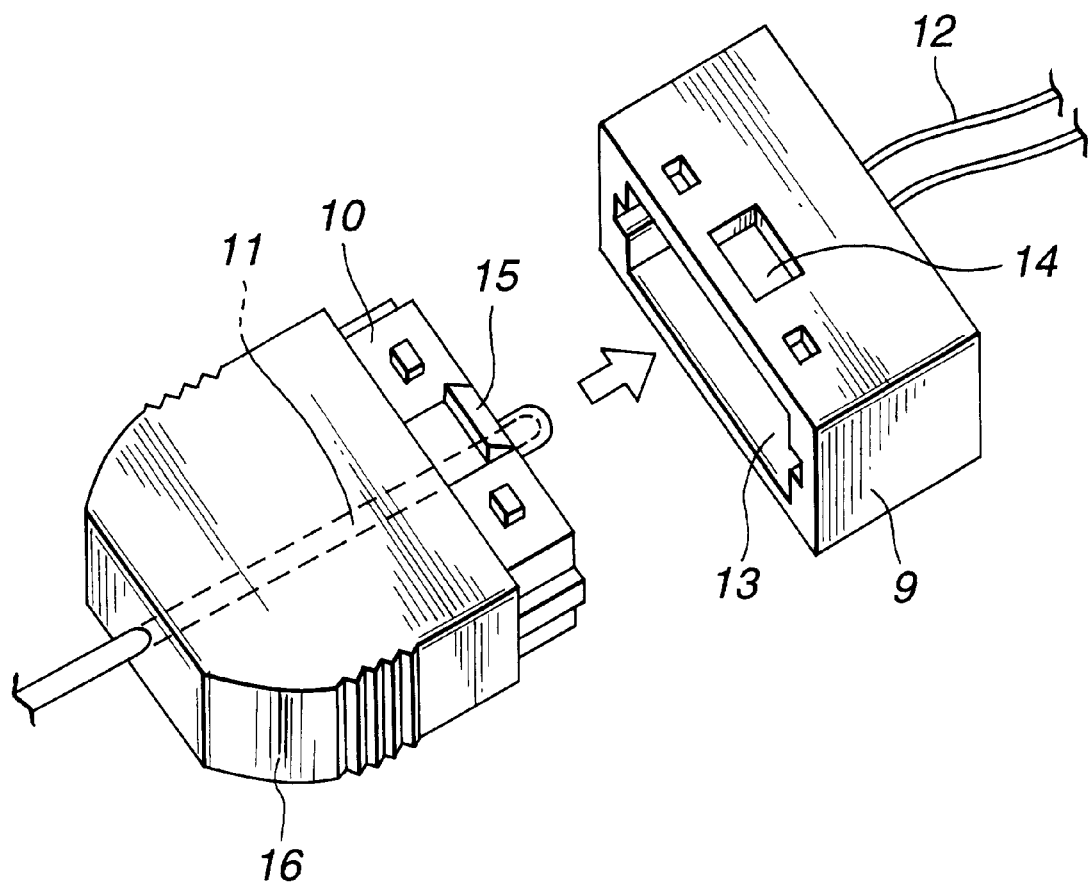
FIG. 5 is a perspective view showing the external configuration of the optical transmission-reception apparatus.

As shown in FIG. 2 and FIG. 5, the housing 7 is contained in a socket 9. The socket 9 is provided with a plug fitting hole 13. With this plug fitting hole 13 is detachably fitted a connector portion 10 including a plug 16 holding an end portion of the optical fiber 11. When the connector portion 10 is fitted in the plug fitting hole 13, the end portion of the optical fiber 11 is positioned on the optical axis of the lens 8, opposing to the lens 8.

The connector portion 10 has a side provided with a locking claw 15 which is flexibly displaceable. When the connector portion 10 is fitted in the plug fitting hole 13, the locking claw 15 is engaged with a lock hole 14 provided on the side wall of the plug fitting hole 13 to prevent detachment of the connector portion 10 from the plug fitting hole 13. Moreover, from this socket 9 are extending cords 12 connected to the laser diode 3 and the photo diode 4.

Figure 7:
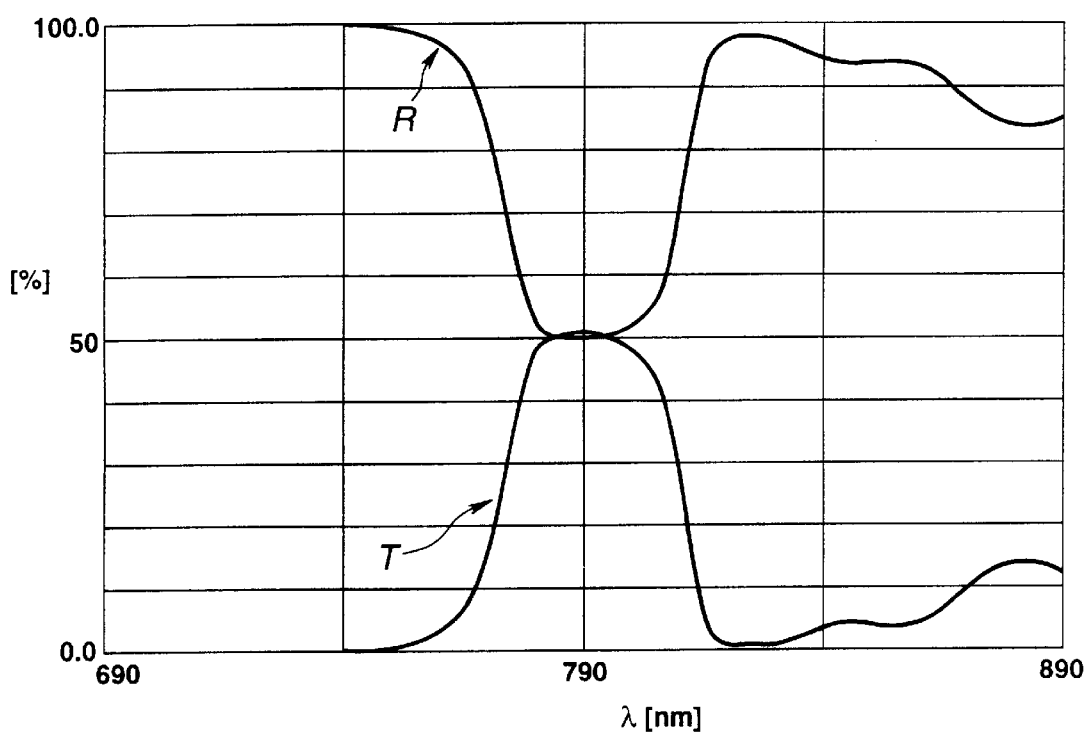
FIG. 7 is a graphic chart showing reflection and transparency characteristics of the beam splitting film constituting the optical transmission-reception apparatus with respect to a non-polarized (random-polarized) beam.

The second optical signal L2 fed through the optical fiber 11 to this optical transmission-reception apparatus is emitted from the end face of the optical fiber 11 and via the lens 8 reaching the beam splitting film 6. This second optical signal L2 is transmitted while being reflected by the inner wall of the optical fiber 11 and accordingly, is a non-polarized (random polarized) beam. As shown in FIG. 7, the beam splitting film 6 exhibits a reflectance R of approximately 50% for a non-polarized beam at the design center wavelength (for example, 790 nm). This reflectance R is equivalent to:

$$R=(Rp+Rs)/2 \quad (1)$$

Moreover, the beam splitting film 6 exhibits a transmittance of approximately 50% for a non-polarized beam at the design center wavelength. This transmittance T is equivalent to:

$$T=(TP+TS)/2 \quad (2)$$

and becomes approximately 50% because $$Tp=100-Rp \quad (3)$$

$$Ts=100-Rs \quad (4)$$

Consequently, the beam splitting film 6 makes allows more than half of the second optical signal L2 emitted from the end face of the optical fiber 11 to reach the photodiode 4. That is, the beam splitting film 6 is provided on the optical path between the laser diode 3 and the end face of the optical fiber 11 so that the second optical signal L2 emitted from the face of the optical fiber 11 is split from the optical path reaching the laser diode 3 and introduced into the photo diode 4. The photo diode receives the second optical signal L2 via the beam splitting film 6.

The photo diode 4 outputs an optical detection output which has been modulated according to the intensity of the second optical signal L2. According to this optical detection output, demodulation processing can be carried out to demodulate the signal which has been fed.

Figure 9:
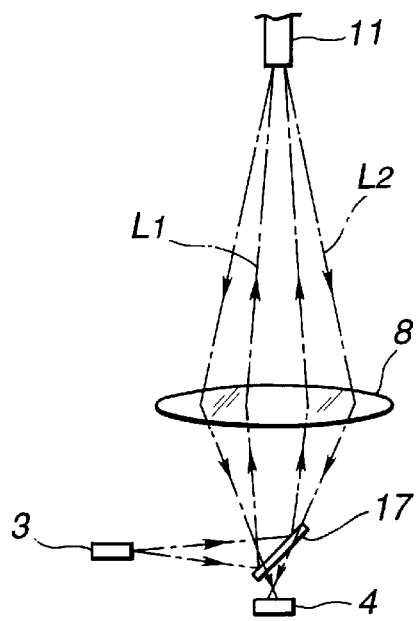
FIG. 9 is a side view showing still another example of the essential portion of the optical transmission-reception apparatus according to the present invention.

Moreover, in the optical transmission-reception apparatus according to the present invention, instead of arranging the laser diode 3 and the photo diode 4 on the same substrate, it is possible, as shown in FIG. 9, to arrange them as independent elements. In this case, the beam splitting film is formed on the surface of a transparent parallel flat plate 17 arranged at an angle of 45 degrees to the optical axis of the first optical signal which is a beam emitted from the laser diode 3. In this case also, the first optical signal is introduced as an S-polarized beam to the beam splitting film and almost 100% of the light quantity is reflected which is introduced through the lens 8 into the end face of the optical fiber 11.

The second optical signal is a non-polarized beam and approximately 50% of the light quantity passes through the beam splitting film, reaching the photo diode 4.

Figure 8:
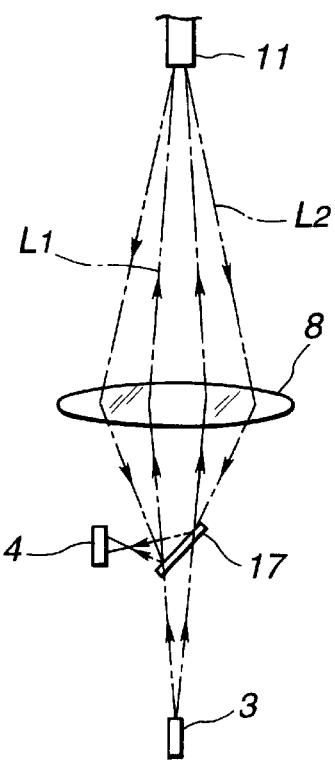
FIG. 8 is a side view showing another example of the essential portion of the optical transmission-reception apparatus according to the present invention.

Moreover, in the case when the laser diode 3 and the photo diode 4 are arranged as independent elements in the optical transmission-reception apparatus according to the present invention, as shown in FIG. 8, the configuration may be such that the first optical signal passes through the beam splitting film and via the lens 8 reaching the optical fiber 11. In this case also, the beam splitting film is formed on the transparent parallel flat plate 17 arranged at an angle of 45 degrees to the optical axis of the first optical signal L1 which is a beam emitted from the laser diode 3. In this case, the first optical signal is introduced in a P-polarized state to the beam splitting film. This beam splitting film, according to FIG. 6 and Equation (3), passes almost 100% of the P-polarized beam at the designed center wavelength (for example, 790 nm). The first optical signal L1 which has passed through the beam splitting film is introduced via the lens 8 to the end face of the optical fiber 11.

As the second optical signal L2 is a non-polarized beam, approximately 50% of the light quantity is reflected by the beam splitting film to be received by the photo diode 4.

The configuration as has thus far been described enables to enhance the efficiency of introduction of a transmission optical signal to an optical fiber constituting an optical communication circuit and to provide an optical transmission-reception apparatus having a sufficient performance and reliability for an optical communication circuit without increasing the light quantity emitted from the light-emitting element which outputs an optical signal to be transmitted.

What is claimed is:

1. An optical transmission-reception apparatus comprising:
   an optical transmission medium connection block to which an optical transmission medium is connected for transmitting to a second end face a first optical signal inputted from a first end face;
   a light-emitting element for emitting said first optical signal which is in a linearly polarized state;
   a beam splitting film provided on an optical path starting at said light-emitting element and reaching said first end face of said optical transmission medium, so as to split a second optical signal emitted from the first end face of said optical transmission medium, a first polarization component of said second optical signal passing through said film, a second polarization component of said second optical signal being reflected by said film, approximately 100% of said first optical signal continuing on said optical path toward said first end face of said optical transmission medium after said beam splitter; and
   a light-receiving element for receiving at least one of said first and second polarization components of said second optical signal via said beam splitting film.

2. An optical transmission-reception apparatus as claimed in claim 1, wherein said beam splitting film has such a characteristic that an S-polarized optical signal is reflected and a P-polarized optical signal passes through.

3. An optical transmission-reception apparatus as claimed in claim 2, wherein said light-emitting element emits an S-polarized optical signal.

4. An optical transmission-reception apparatus as claimed in claim 2, wherein said light-emitting element emits a P-polarized optical signal.

5. An optical transmission-reception apparatus as claimed in claim 1, wherein said light-emitting element and said light-receiving element are arranged on a single substrate, and said beam splitting film is formed on a surface of a prism arranged on said substrate.

6. An optical transmission-reception apparatus as claimed in claim 1, wherein said optical transmission medium is an optical fiber cable.

7. An optical transmission-reception apparatus as claimed in claim 1, said apparatus further comprising a lens arranged on an optical path between said beam splitting film and the first end face of said optical transmission medium connected to said optical transmission medium connection block so that said first optical signal is introduced to said first end face of said optical transmission medium.

8. The apparatus of claim 1, wherein the first polarization component is substantially orthogonal to the second polarization component.

9. An optical transmission-reception apparatus comprising:
   an optical transmission medium connection block to which an optical transmission medium is connected for transmitting to a second end face a first optical signal inputted from a first end face;
   a light-emitting element for emitting said first optical signal which is in a linearly polarized state;
   a beam splitting film provided on an optical path starting at said light-emitting element and reaching said first end face of said optical transmission medium, so as to split a second optical signal emitted from the first end face of said optical transmission medium; and
   a light-receiving element for receiving at least one polarization component of said second optical signal via said beam splitting film,
   wherein said beam splitting film has such a characteristic that an S-polarized optical signal is approximately 100% reflected and a P-polarized optical signal is approximately 100% transmitted, such that approximately 100% of said first optical signal continues on said optical path toward said first end face of said optical transmission medium after said beam splitter.

10. An optical transmission-reception apparatus as claimed in claim 9, wherein said light-emitting element emits an S-polarized optical signal.

11. An optical transmission-reception apparatus as claimed in claim 9, wherein said light-emitting element emits a P-polarized optical signal.

12. An optical transmission-reception apparatus comprising:

an optical transmission medium connection block to which an optical transmission medium is connected for transmitting to a second end face a first optical signal inputted from a first end face;

a light-emitting element for emitting said first optical signal which is in a linearly polarized state;

a beam splitting film provided on an optical path starting at said light-emitting element and reaching said first end face of said optical transmission medium, so as to split a second optical signal emitted from the first end face of said optical transmission medium and reaching said light-emitting element; and a light-receiving element for receiving said second optical signal via said beam splitting film, wherein said light-emitting element and said light-receiving element are arranged on a single surface of a substrate, and said beam splitting film is formed on a surface of a prism arranged on said substrate.

13. An optical transmission-reception apparatus comprising:

an optical transmission medium connection block to which an optical transmission medium is connected for transmitting to a second end face a first optical signal inputted from a first end face;

a light-emitting element for emitting said first optical signal which is in a linearly polarized state;

a beam splitting film provided on an optical path starting at said light-emitting element and reaching said first end face of said optical transmission medium, so as to split a second optical signal emitted from the first end face of said optical transmission medium and reaching said light-emitting element;

a light-receiving element for receiving said second optical signal via said beam splitting film; and a lens arranged on an optical path between said beam splitting film and the first end face of said optical transmission medium connected to said optical transmission medium connection block so that said first optical signal is introduced to said first end face of said optical transmission medium, wherein said lens is engaged to be held in a through hole formed in an upper plane of a frame shaped housing.

14. An optical transmission-reception apparatus comprising:

means for optically transmitting a first optical signal to a second end face inputted from a first end face;

means for emitting said first optical signal which is in a linearly polarized state;

means for splitting a second optical signal emitted from the first end face of said optical transmitting means, approximately 100% of a first polarization component of said second optical signal passing through said splitting means, approximately 100% of a second polarization component of said second optical signal being reflected by said splitting means, approximately 100% of said first optical signal continuing on an optical path including said splitting means toward said first end face of said optical transmitting means after said splitting means; and means for receiving at least one of said first and second polarization components of said second optical signal via said splitting means.

15. An optical transmission-reception apparatus comprising:

means for optically transmitting a first optical signal to a second end face inputted from a first end face;

means for emitting said first optical signal which is in a linearly polarized state;

means for splitting a second optical signal emitted from the first end face of said optically transmitting means; and means for detecting at least a first polarization component of said second optical signal via said splitting means, wherein said splitting means has such a characteristic that a first polarization component is approximately 100% reflected and a second polarization component is approximately 100% transmitted, such that approximately 100% of said first optical signal continues on said optical path toward said first end face of said optically transmitting means after said splitting means.

\* \* \* \* \*